Patented Apr. 10, 1934

1,954,326

UNITED STATES PATENT OFFICE 1,954,326

CELLULOSIC COMPOSITION OF MATTER CONTAINING CYCLOHEXANONE AND ORTHO - CRESYL PARA - TOLUENE SULPHONATE

Thomas F. Murray, Jr., and Cyril J. Staud, Rochester, N. Y., assignors to Eastman Kodak Company, Rochester, N. Y., a corporation of New York No Drawing. Application September 12, 1930, Serial No. 481,587

2 Claims. (Cl. 106—40)

This invention relates to compositions of matter in which cellulose derivatives, such as cellulose acetate, cellulose nitrate, or cellulose ether, are combined or mixed with other substances, such as a compatible plasticizer, and a common solvent for both, with or without other useful addition agents, so that the resulting product will have properties such as will make the composition highly advantageous for use in the plastic and analogous arts, such, for instance, as the manufacture of wrapping sheets, photographic film, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Another object of our invention is to produce a composition containing a mixed plasticizer which in addition to other things, fits film made therefrom to certain special uses. Other objects will become apparent to those skilled in the art to which this invention pertains.

While cellulose acetates, nitrates and ethers have been known for decades it has also been known that to utilize them in the various plastic arts it is necessary to mix therewith such plasticizing or conditioning agents as camphor, castor oil, triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetates, nitrates and ethers to prepare them for use in the other plastic arts, such as in the manufacture of lacquers, varnishes, artificial silk filaments, moulded compounds and the like. While the plasticizers or other addition agents heretofore discovered have had their utility in the art, the increasing number of desirable properties required of the cellulose derivative for most purposes has made the discovery of new and economical plasticizers or other addition agents a matter of considerable importance to the art.

Ortho-cresyl para-toluene sulphonate is described and claimed in Carroll Patent 1,560,542, as a useful plasticizer, particularly for cellulose acetate compositions and is valuable as such in most instances. While we have found that film so plasticized has the distinct advantage of resisting the action of bleach solutions, such as those encountered in the negative-positive reversal process of developing amateur motion picture film, the film is found not to maintain flexibility in drying atmospheres to as great an extent as might be desired at times.

We have found that by adding cyclohexanone to a film plasticized with o-cresyl p-toluene sulphonate that resistance to bleaching solutions continues and that the film will also resist embrittlement to a marked degree during the subjection thereof to drying atmospheres even for a number of times such as when the film is employed as leader strip for conducting thru the processing bath and drying chamber Ciné films which are being processed. This is most unexpected inasmuch as it is only when these plasticizing compounds are jointly present in the cellulose derivative or acetate composition that the combined modification of the properties of the film in the manner described results.

In order that those skilled in this art may better understand our invention we would state, by way of illustration, that for the manufacture of photographic film or other sheets our new composition of matter may be compounded as follows: 100 parts of acetone soluble cellulose acetate i. e. cellulose acetate containing from 38% to 42% acetyl radical, approximately, is dissolved with stirring at atmospheric temperature in approximately 500 parts of acetone containing a mixture of about 75 cc. of cyclohexanone and about 7.5 grams of ortho-cresyl para-toluene sulphonate. The amount of mixed plasticizer, or each of the components thereof, may be decreased or increased, depending upon whether it is desired to decrease or increase, respectively the properties which this mixed plasticizer or its components contributes to the finished product. The amount of solvent employed may also be decreased or increased, depending upon whether it is desired to have a more or less freely flowing composition, respectively.

A composition of matter prepared as above described may be deposited upon any suitable film forming surface to form a film or sheet, as is well known to those skilled in the art. A film so produced has permanently brilliant transparency and low inflammability, burning no more readily than ordinary newsprint. Such film is tough and flexible, even under the conditions referred to, as shown by the fact that it will withstand many folds upon a modified Schopper fold-tester (commonly used for such purposes) without breaking and that even after being subjected for a considerable number of days to air maintained at a temperature of 65° C. (either before or after being subjected to bleaching solutions) the film still maintains flexibility (in contrast to almost complete lack of flexibility where no plasticizer is used) demonstrating that the film will withstand ordinary usage satisfactorily for a considerable period. The sum total of the above advantageous properties of a product produced from our new composition is considerably in excess of that of products produced with what have previously been regarded as the better plasticizers.

Other similar solvents (instead of acetone) which are compatible with the cellulose acetate and our new plasticizer may also occur to those skilled in this art. In like manner this plasticizer may be compounded with other single organic esters of cellulose, such as cellulose propionate, butyrate and the like, or with mixed organic and/or inorganic esters, such as cellulose aceto-stearate, aceto-malate, or cellulose nitro-acetate, or with the cellulose ethers, a suitable solvent which will dissolve both the cellulosic derivative and the plasticizer being employed.

Inasmuch as our above described composition of matter is quite useful in the production of films and sheets it will be apparent that our new plasticizer may also be employed with advantage in the other branches of the plastic art. For instance, our above described composition of matter may be employed in the manufacture of artificial silk by the dry spinning method. With the proper coagulating bath it may also be employed for wet spinning. It may be desired to employ a composition of different viscosity or evaporation characteristics but this is a mere matter of changing the solvent proportion or adding evaporation retardants or other high or intermediate boiling constituents, as has been well known in the art for more than a decade. Our novel plasticizer may also be employed with advantage in connection with a number of the known lacquer and varnish formulæ with which it may be found to be compatible. In such cases the plasticizer is usually first put into solution with the cellulose derivative solution and if non-solvents are added for the purpose of cheapening the composition they are added only to such an extent as will not precipitate the derivative from solution. Other uses within the scope of our invention will also suggest themselves to those skilled in the art and are to be included within the scope of the claims appended hereto.

What we claim as our invention, and desire to be secured by Letters Patent of the United States, is:

1. A composition of matter containing 100 parts cellulose acetate and about 75 parts by weight of cyclo-hexanone and 7 to 8 parts of ortho-cresyl para-toluene sulphonate as a mixed plasticizer for the cellulose acetate.

2. A transparent, flexible sheet comprising 100 parts of cellulose acetate and about 75 parts of cyclohexanone and 7 to 8 parts, by weight, of o-cresyl p-toluene sulphonate homogeneously dispersed throughout the cellulose acetate as a mixed plasticizer therefor.

THOMAS F. MURRAY, Jr.
CYRIL J. STAUD.